UNITED STATES PATENT OFFICE.

JERRY NAJARIAN, OF HARTFORD, CONNECTICUT.

INSULATING COMPOSITION.

1,427,621. Specification of Letters Patent. Patented Aug. 29, 1922.

No Drawing. Application filed February 19, 1921. Serial No. 446,459.

*To all whom it may concern:*

Be it known that I, JERRY NAJARIAN, formerly a resident of Armenia, residing at Hartford, in the county of Hartford and State of Connecticut, have invented certain new and useful Improvements in Insulating Composition, of which the following is a specification.

This invention relates to an insulating composition. A composition of matter involving the invention can be utilized with advantage in many different ways although it is of especial utility when employed in insulating, that is to say electrical insulating although it is conceivable of course that it can be employed with equal advantage in other connections. For instance it might constitute a facing for a knife or be utilized in similar fashion. By its use I can effectively and thoroughly insulate an electrical work and of course it can be used in appurtenances of various kinds such as switches and trolley work which are merely two of many illustrations in this particular field.

I employ a mixture involving in its make-up asbestos, gum mastique, incense, gum tragacanth, the whites of eggs and rag waste. Desirably this rag waste is incinerated or burned so as to obtain an ash. The proportions of the ingredients may vary decidedly but it will be assumed that a five pound mass is desired. In this event I would use one pound of gum mastique, one-half pound of incense, three pounds of asbestos, one ounce of gum tragacanth, one-fourth pound of burnt rags and the whites of two eggs. Initially I burn or incinerate sufficient rag waste to obtain about one-fourth pound of rag ash which is utilized in the mixture. This one-fourth pound of burnt rags is mixed intimately and throughly with the whites of two eggs. Gum mastique, incense, asbestos and gum tragacanth practically in the proportions set forth are then placed in a suitable vessel or receptacle and thoroughly and intimately mixed either by agitation or otherwise. When these ingredients are thoroughly commingled the mixture of burnt rag ash and egg albumen is associated or mixed with the other mixture and by further agitation the mass is intimately and closely mingled. This obtains a plastic mass. The mixture is desirably subjected to heat when the ingredients are mixed and this heat say one hundred degrees Fahrenheit softens the mass or mixture sufficiently to enable it to be easily molded. In this condition it is poured from the vessel, into a mold of the proper size and when the mass is cold it is taken out in condition for use. I prefer that the mold into which the mixture is poured, in molten condition, be cold so that when the mass hardens in the mold it is ready for use. I might note that the product is not affected by moisture, oil or like substances. I might also note that the composition can be cut into small pieces and softened as desired and then shaped variously to meet the conditions expected of it. The resultant article I might also observe cannot be affected by moisture or oil.

What I have called incense is an ordinary article of commerce and can be purchased in bulk in any drug store in the United States or in the world for that matter. It is used in religious and other ceremonies.

I deem it proper to state that incense is a mixture of a certain gum and spices which produce a sweet odor when burned. It is composed of the following sweet spices; stacte, onycha and galbanum, and a certain gum called frankincense. The frankincense is the condensed juice of a certain tree. This juice comes out of the pores of the trunk of a tree and forms the gum. The weight of the said frankincense in the mixture, is about equal to the weight of the above three spices.

What I claim is:

A mixture of the class described comprising gum mastique, incense of commerce, asbestos, gum tragacanth, rag ashes and the white of eggs.

In testimony whereof I affix my signature.

JERRY NAJARIAN.

In presence of—
 HEATH SUTHERLAND,
 GEORGE DER LARKESIAR.